(12) United States Patent
May et al.

(10) Patent No.: US 8,434,684 B2
(45) Date of Patent: May 7, 2013

(54) CAPACITIVE DATA BODY AND DATA READING DEVICE THEREOF

(75) Inventors: George A. May, Sooke (CA); Koichi Awano, Tokyo (JP)

(73) Assignee: Tokyo Mechatronics Co., Limited, Tokyo (JP)

( * ) Notice: Subject to any disclaimer, the term of this patent is extended or adjusted under 35 U.S.C. 154(b) by 87 days.

(21) Appl. No.: 12/678,204

(22) PCT Filed: Sep. 14, 2007

(86) PCT No.: PCT/JP2007/068492
§ 371 (c)(1),
(2), (4) Date: Mar. 15, 2010

(87) PCT Pub. No.: WO2009/034660
PCT Pub. Date: Mar. 19, 2009

(65) Prior Publication Data
US 2010/0206952 A1 Aug. 19, 2010

(51) Int. Cl.
*G06K 7/08* (2006.01)
(52) U.S. Cl.
USPC .............................. 235/451; 235/487; 235/492
(58) Field of Classification Search .................. 235/435, 235/451, 487, 492
See application file for complete search history.

(56) References Cited

U.S. PATENT DOCUMENTS

| | | | | |
|---|---|---|---|---|
| 5,159,181 A | * | 10/1992 | Bartels et al. | 235/441 |
| 5,430,278 A | * | 7/1995 | Krieg et al. | 235/449 |
| 5,453,602 A | * | 9/1995 | Hanada | 235/439 |
| 6,202,929 B1 | * | 3/2001 | Verschuur et al. | 235/462.25 |
| 6,762,683 B1 | * | 7/2004 | Giesler | 340/572.8 |
| 7,490,772 B2 | * | 2/2009 | Kemppainen et al. | 235/462.09 |
| 2006/0131411 A1 | * | 6/2006 | Huomo et al. | 235/451 |
| 2006/0138233 A1 | * | 6/2006 | Kemppainen et al. | 235/451 |

FOREIGN PATENT DOCUMENTS

| | | |
|---|---|---|
| JP | 4-107693 | 4/1992 |
| JP | 2006-41986 A1 | 2/2006 |

OTHER PUBLICATIONS

International Search Report for International Application No. PCT/JP2007/068492 dated Nov. 26, 2007.

* cited by examiner

*Primary Examiner* — Daniel Hess
*Assistant Examiner* — Paultep Savusdiphol
(74) *Attorney, Agent, or Firm* — Kratz, Quintos & Hanson, LLP

(57) ABSTRACT

Capacitive data electrostatically recorded on a medium such as cards, papers, and labels is read by shifting the medium and the data reading device opposite to each other. The capacitive data is formed in multiple kinds of different widths and contains a plurality of electrode planes 23 formed being spaced apart from each other in one direction or in a direction opposite to the one direction, and non-electrode planes 24 or ground electrode planes 24a formed between electrode planes 23, and forms a capacitor between the electrode planes 23 and the electrode for reading data, and a string of data (01, 11, and 11) is read according to temporal changes (T2, T4 and T4) in an electrostatic induction voltage value in accordance with the width of the electrode planes 23 and the non-electrode planes 24 or the ground electrode planes 24a, when the electrode for reading data charged on the electrode planes 23 and the non-electrode planes 24 or the ground electrode planes 24a are scanned in one direction.

2 Claims, 10 Drawing Sheets

A

B

A

B

A

B

A

B

CAPACITIVE DATA BODY AND DATA READING DEVICE THEREOF

FIELD OF THE INVENTION

The present invention relates to a capacitive data body where a string of data is electrostatic inductively read and a data reading device of the capacitive data.

DESCRIPTION OF THE RELATED ART

A data card of low price and its reading device which can read and (or) write on data by using an electrostatic inductively linked interface have been known in the undermentioned patent reference 1.

In conventional technologies for electrostatic inductively reading data (capacitive technology) including a technology as shown in the patent reference 1, electrodes on the reader side and electrodes on the card side are closely arranged in a confronted position as well as electrodes on the data side are kept in a suspended condition against electrodes on the reader side to form a capacitive circuit between the electrodes on the reader side and the electrodes on the card side to read data. When a capacitive circuit is formed between electrodes on the reader side and electrodes on the card side, the reading device recognizes the data value of the electrodes where a high voltage is detected as "1" and the data value of the electrodes where a low voltage is detected as "0", and reads out the information written in the data card.

Methods of suspending a medium which has data for a reading device from such principle of reading data have been common. In addition, prevailing reading devices required a constitution for adjusting positions in order to arrange electrodes on the data side in a confronted position to electrodes on the reader side and to suspend them.

Patent reference 1—Japanese Patent Disclosure No. 3092012.

BRIEF SUMMARY OF THE INVENTION

However, a data card stored with the aforementioned capacitive data could not read capacitive data even at the time of being used as an ID card unless the card is suspended. Thus, the application range has still been limited.

In addition, data cards that data are written on by using the aforementioned capacitive technology include those stored with magnetically written data. Magnetic data are read by sliding the card, and capacitive data are read in a suspended position. This is a difference in their reading methods. Thus, reading devices, even provided with a constitution of reading both magnetic data and capacitive data, could not read both magnetic data and capacitive data by sliding the data card.

Moreover, in an application of identifying the document affixed with a label with a capacitive ID data for security purpose of documents, when the affixed ID label is laid in a slant position, it is very difficult to adjust the position of electrodes on the reader side with the position of electrodes on the capacitive data side and requires a special technique to adjust the positions.

The present invention was made in light of such situation and intends to provide a capacitive data body as a medium which can read capacitive data electrostatically recorded on a medium such as cards, papers and labels by shifting the medium and a data reading device opposite to each other and the data reading device of capacitive data on the medium.

In order to accomplish the aforementioned object, a capacitive data of the present invention that a string of data printed on cards, papers and labels as a medium is read electrostatic inductively, having a plurality of types of different predetermined widths and a plurality of electrode planes formed being spaced apart from each other in one direction and non-electrode planes or ground electrode planes formed between the electrode planes, is characterized in that, when electrodes for reading data charged on the electrode planes and the non-electrode planes or the ground electrode planes are scanned in one direction or in a direction opposite to the one direction, a capacitor is formed between the electrode planes and the electrodes for reading data and a string of data is read by an electrostatic induction change in voltage value according to the width of the electrode planes.

Further, the present invention relates to a data reading device which reads out a string of data from a capacitive data electrostatic inductively. The device, closely approached to the capacitive data having electrodes for reading data of shifting opposite to the capacitive data, a RF generator as a power supply device for charging the electrodes for reading data, and non-electrode planes or ground electrode planes formed between a plurality of electrode planes with multiple kinds of different predetermined widths and formed being spaced apart from each other in one direction and the electrode planes, is characterized in having a detecting method for reading an electrostatic induction change in voltage value according to the width of the electrode planes from the capacitive data when the charged electrodes for reading data are scanned on the electrode planes and non-electrode planes or ground electrode planes in one direction or in a direction opposite to the one direction and a capacitor is formed between the electrode planes and the electrodes for reading data, and a method for reading data reading a string of data recorded on the capacitive data.

According to the present invention, since electrodes for reading data read data of the capacitive data according to the time passed through on the electrode planes of the capacitive data, the device can read data by shifting the electrostatically recorded capacitive data and the data reading device for the capacitive data opposite to each other.

EXPLANATION OF NUMBERS

Figure 1:
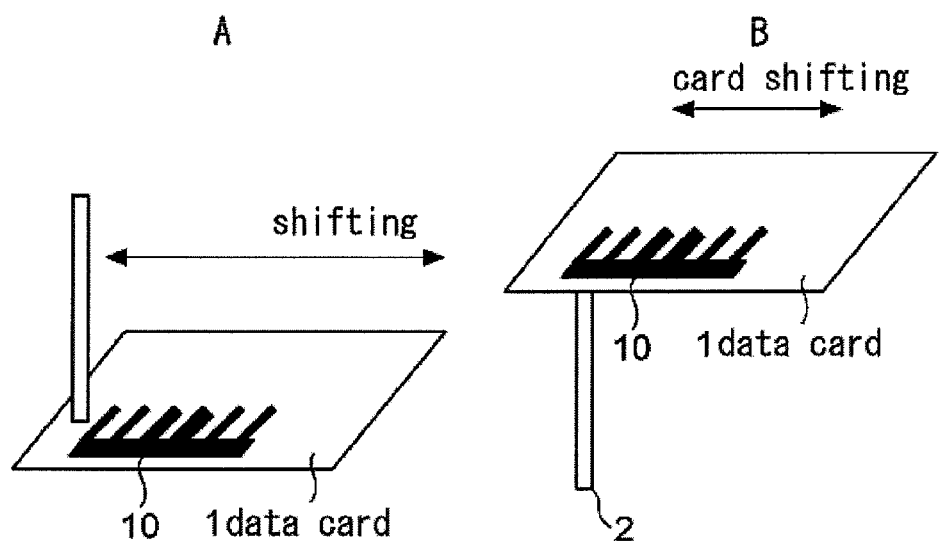
FIG. 1 is a perspective view illustrating a capacitive data and a using method of data reading device of the present invention.

1 Capacitive data
2 Data reading device
3 ID code recording part
21 RF common electrode
22 Ground common electrode
23 Electrode plane
24 Non-electrode plane
24a Ground common electrode plane
31a, 31b, 31c Electrode sensor part
32 Power source

DETAILED DESCRIPTION OF THE INVENTION

Preferred embodiments of the present invention will now be concretely described with referent to the drawings. The following embodiment is only example for the present invention. Therefore, the present invention is not limited to the following embodiment and even in any case except for the present embodiment various changes according to designs and others may be made without departing from the technical spirit of the present invention.

As shown in FIG. 1, an example of the present invention is applied to the capacitive data body 1 and the data reading device 2 of the capacitive data. The capacitive data body 1 is constituted of a ID code recording part 10 where ID codes are read from the data reading device electrostatic inductively. As shown in FIG. 1A, the data reading device 2 has a sensor pen in a form of pen type, and reads ID codes which are exhibited by the ID code recording part 10 of the capacitive data body 1 by closely shifting above the ID code recording part of the capacitive data body 1. Further, as shown in FIG. 1B, ID codes of the ID code recording part 10 may be read by shifting the capacitive data body 1 in a condition that the data reading device 2 is fixed. The present embodiment illustrates an example that ID codes as an identifier for users' authentication and others are recorded. The capacitive data body 1 can of course record any data in addition to ID codes as the ID code recording part 10.

Constitutions as shown in FIGs. A, B, and C are examples of the capacitive data body 1.

Figure 2:
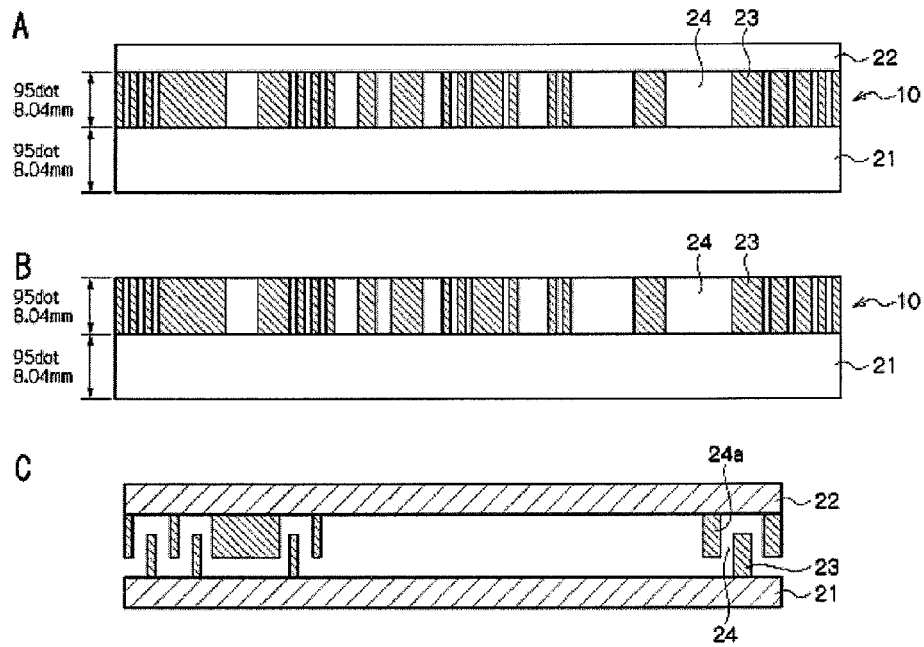
FIG. 2 is a top plan view illustrating a capacitive data of the present invention.

As shown in FIG. 2A, a plurality of electrode planes 23 in a rectangular form and non-electrode planes 24 made of non-conductive material are alternately arranged to each other and pasted on the RF common electrode 21 and the ground common electrode 22 in a barcode form. In this capacitive data, when the electrode sensor parts 31a and 31b of the data reading device 2 as referred to hereinafter are arranged closely opposite to each other in a charged state, an electric charge is generated in a space between the electrode sensor parts 31a and 32b and the electrode planes 23 and the electric charge of the electrode planes 23 is detected. Further, as shown in FIG. 2B, the capacitive data may be one without the ground common electrode 22 in the top and bottom surfaces of the figure. As shown in FIG. 2C, a plurality of the electrode planes 23 in a rectangular form linked with the RF common electrode 21 and a plurality of electrode planes 24a linked with the ground common electrode 22 may be arranged alternately to each other and arranged alternately with the non-electrode planes 24 made of non-conductive material. The example as shown in FIG. 2 shows an only constitution where the electrode planes 23 and the non-electrode planes 24 or a plurality of electrode planes 24a linked with the ground common electrode 22 of the capacitive data card 1 are laid. In a practical use, the electrode planes 23 and the non-electrode planes 24 or a plurality of electrode planes 24a linked with the ground common electrode 22 are covered with a protection material of synthetic resin material and then formed on the medium.

Figure 3:
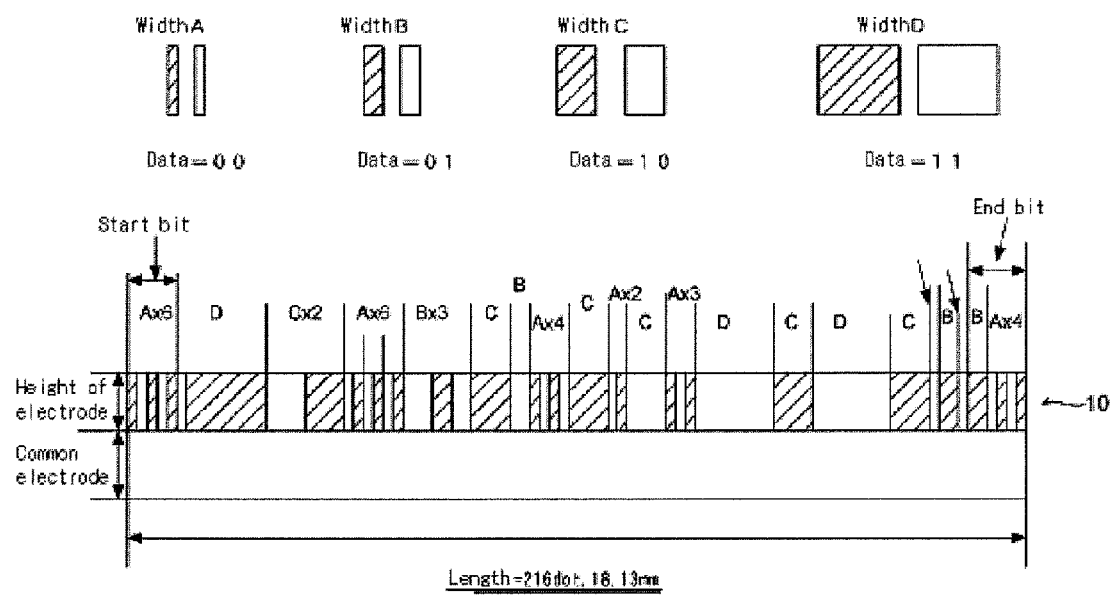
FIG. 3 is a top plan view illustrating an electrode formation pattern of a capacitive data of the present invention.

As shown in FIG. 3, a plurality of the electrode planes 23 and the non-electrode planes 24 or a plurality of electrode planes 24a linked with the ground common electrode 22 are arranged being adjusted to different predetermined widths such as the widths A, B, C and D. With the help of the predetermined widths, the electrode planes 23 and the non-electrode planes 24 or a plurality of the electrode planes 24a linked with the ground common electrode 22 induce the data reading device 2 to read a string of data "00", "01", "10" and "11".

Figure 4A:
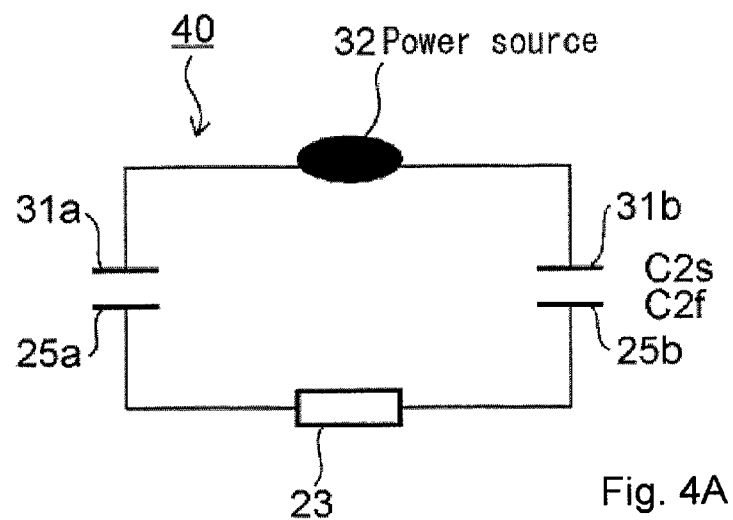
FIG. 4 is a circuit diagram formed by a capacitive data and a data reading device of the present invention.

As shown in FIG. 4A, in capacitive data, when the electrode sensor parts 31a and 31b of the data reading device 2 are charged by the power source 32, the RF common electrode 21 and the electrode plane 23 become one with the electrode sensor part 31a and the RF common electrode 21 of the data reading device 2 formed on the data reading device 2 and the RF common electrode 21 and the electrode sensor part 31b becomes one with the electrode 23, to form the circuit 40 having a capacitor.

In a capacitive data, the electrode plane 23 with function of resistance, the electrode parts 25a (RF common electrode 21) and 25b (electrode plane 23) which form a part of capacitor to be wire-connected with each end terminal of the electrode plane 23. The data reading device 2 has the electrode sensor parts 31a and 31b which form a part of capacitor to be wire-connected with each end terminal of the power source 32 of the data reading device 2. When the electrode parts 25a and 25b of the capacitive data are arranged closely opposite to the electrode sensor parts 31a and 31b, the circuit 40 having an air capacitor with the air is formed between each electrode parts.

In the circuit 40 formed in such way, when the electrode sensor parts 31a (C1s) and 31b (C2s) of the data reading device 2 are arranged closely opposite to the electrode part 25a (C1f) of the RF common electrode 21 and the electrode part 25b (C2f) of the electrode plane 23, the power source 32 becomes conductive with the RF common electrode 21 (electrode part 25a) via the air capacitor, and the electrode plane 23 becomes conductive with the electrode part 25. A high voltage value of the sensor is detected in the voltage detection circuit of the data reading device 2 (the detection method is not shown here).

Figure 4B:
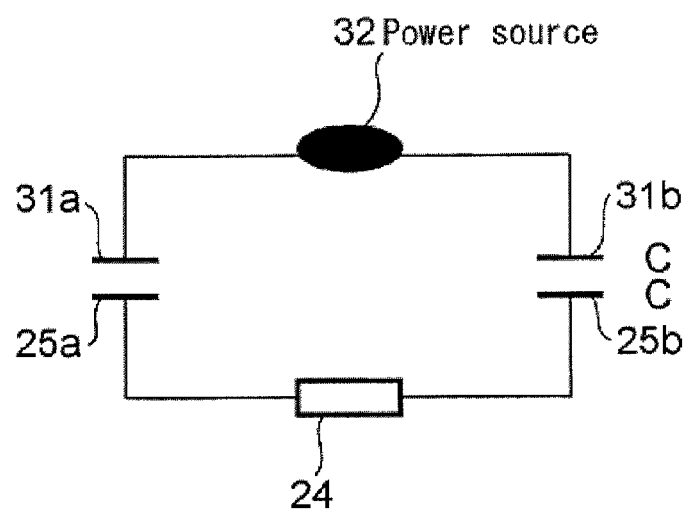

On the other hand, as shown in FIG. 4B, in the case in which the electrode sensor parts 31a and 31b of the data reading device 2 are arranged on the non-electrode plane 24 or the ground electrode plane 24a, no electric current is carried to the non-electric electrode plane 24 and the ground electrode plane 24a. Therefore, even when any electric charge is generated between the electrode sensor part 31b and the electrode part 25b, a low voltage value may be detected in the voltage detection circuit of the data reading device 2.

Figure 5:
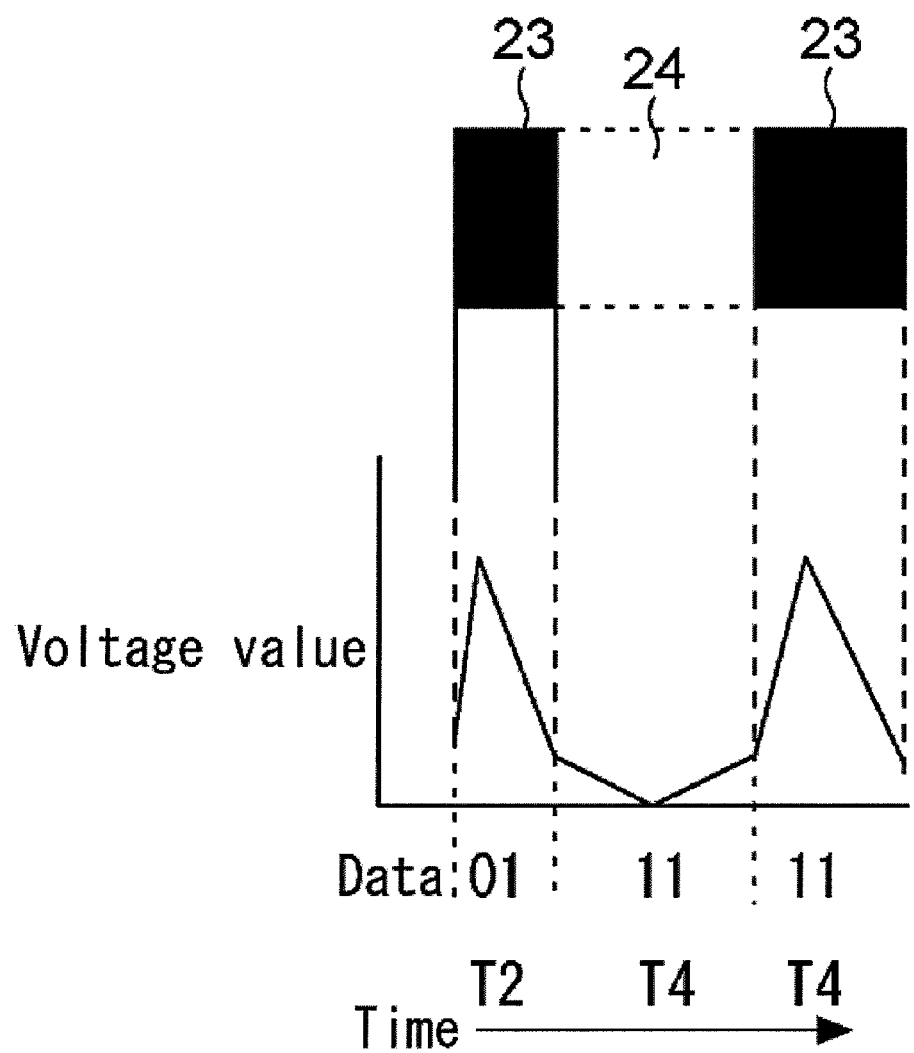
FIG. 5 is a view showing a relation between temporal and voltage value changes for illustrating the movement of reading a string of data recorded in a capacitive data of the present invention by a data reading device.

For example, as shown in FIG. 5, in the case in which the data reading device 2 scans the electrode plane 23 of the width 1, the non-electrode plane 24 of the width 2, and the electrode 23 of the width 2 at a roughly constant speed, the data reading device 2 detects a high voltage value on the electrode plane 23 of the width 1, then a low voltage value on the non-electrode plane 24 or the ground electrode plane 24a of the width 2, and next a high voltage value on the electrode plane 23 of the width 2. Thus, the data reading device 2 determines according to detection durations T2, T4 and T4 of each voltage values that the device has passed through the electrode plane 23, the non-electrode plane 24 or the ground electrode plane 24a, and can read the string of data "011111" from the capacitive data body 1 by using a reading method for determining the voltage value (not shown).

For example, as shown in FIG. 3, in the case in which the data reading device 2 passes through on the capacitive data body 1, the electrode 23 and the non-electrode plane 24 or the ground electrode plane 24a of the width A are read as data "00" in the data reading device 2, the electrode plane 23 and the non-electrode plane 24 of the width B are read as data "01" in the data reading device 2, the electrode plane 23 and the non-electrode plane 24 or the ground electrode plane 24a of the width C are read as data "10" in the data reading device 2 and the electrode plane 23 and the non-electrode 24 or the ground electrode plane 24a of the width D are read as data "11" in the data reading device 2. These four kinds of data are read in the data reading device 2. The electrode planes 23 and the non-electrode planes 24 or the ground electrode planes 24a of four kinds of the widths A, B, C and D are alternately arranged to each other. The data reading device 2 sequentially detects the electrode planes 23 and the non-electrode planes 24 or the ground electrode planes 24a in the direction of the width to read the consecutive string of data. In addition, for four kinds of widths of the electrode plane 23 and the non-electrode plane 24 or the ground electrode plane 24a, users can judge from the speed of shifting opposite to each other between the capacitive data and the data reading device 2 at the time of using the capacitive data body 1 through experiments and distinguish by using the data reading device 2 a change in voltage according to four kinds of the widths at the speed of shifting opposite to each other. Of course, this may apply to the cases of labels or papers as a medium.

For example, when a string of data is read by the data reading device 2 in a manner that the electrode planes 23 and the non-electrode planes 24 are sequentially detected from the left end to the right end in FIG. 3, the electrode planes 23 and the non-electrode planes 24 or the ground electrode planes 24a are formed in a medium such as the capacitive data body 1 so that a start bit is read by the electrode planes 23 and the non-electrode planes 24 or the ground electrode planes 24a on the left end and an end bit is read by the electrode planes 23 and the non-electrode planes 24 or the ground electrode planes 24a on the right end.

Further, when a string of data is read by the data reading device 2 in a manner of detecting the electrode planes 23 and the non-electrode planes 24 or the ground electrode planes 24a sequentially from the right end to the left end in FIG. 3, the electrode planes 23 and the non-electrode planes 24 or the ground electrode planes 24a are formed in a manner that an end bit on the right end is read as a start bit and a start bit on the left end is read as an end bit. In other words, even when the data reading device 2 scans either from the right or from the left of the capacitive data, the same result can be obtained in reading data.

An example as shown in FIG. 3 is constituted of six pieces of the electrode planes 23 and the non-electrode planes 24 or the ground electrode 24a of the width A at the start bit and of five pieces thereof at the end bit. A string of data "0000000000" at the start bit is read into the data reading device 2, a string of data "0011" constituted of the non-electrode planes 24s or the ground electrode planes 24a of the width A and a piece of the electrode plane 23 of the width D is read into the data reading device 2. Thereafter, strings of data from "1010", "0000000000", "010101", to "01" are read into the data reading device 2, a string of data "0100000000" constituted of two-pieces of the electrode planes 23 of the width A on the left end is read into the data reading device 2 at the end bit. Further, when the data reading device 2 starts reading data from the right end of the capacitive data, a string of data at the start bit starts with "0000000001" from the right and a string of data at the end bit starts with "0000000000".

In such a manner, the data reading device 2 can detect a string of data recorded in the capacitive data body 1 by the data reading device 2 according to the time when the electrode planes 23 and the non-electrode planes 24 or the ground electrode planes 24a of the capacitive data body 1 are arranged closely opposite to the electrode sensor parts 31a and 31b of the data reading device 2, and can determine a start-up and end of the string of data recorded in the capacitive data body 1 by the start bit and end bit.

Thus, the capacitive data body 1 and the data reading device 2 of the present invention enables to read a string of data by shifting the data reading device 2 and the capacitive data body 1 opposite to each other with the help of a reading method that the capacitive data body 1 and the data reading device 2 shift opposite to each other, does not require to fix the opposite position between the capacitive data body 1 and the data reading device 2, and does not need another device for fixing the relative position between the capacitive data body 1 and the data reading device 2. Thus, devices for reading a string of data by sliding cards like in the case of magnetic cards can be applied with the capacitive data body 1 and application fields of the capacitive data will be expanded. Moreover, this may realize a reading device for reading cards recorded with both of magnetic data and capacitive data by one-time reading behavior. Capacitive data recorded on mediums such like labels or papers can be read in the same way.

The data reading device 2 will now be explained about reading a string of data from the other patterns of the ID code recording part 10 and the ID code recording part 10 of the pattern in the capacitive data body 1 of the aforementioned constitution. Of course, it is not particularly described, but it is also applied to capacitive data recorded on mediums like labels or papers.

Figure 6:
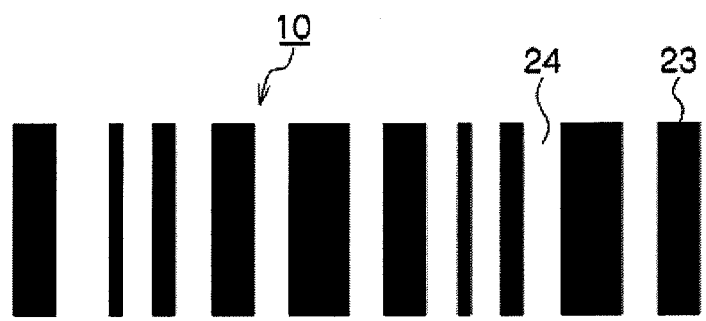
FIG. 6 is a view illustrating a constitution of an electrode sensor part corresponding to a constitution of a capacitive data of the present invention.
Figure 6:
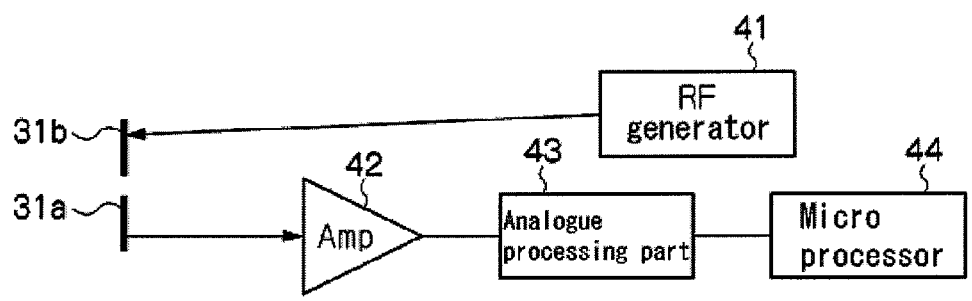
Figure 7:
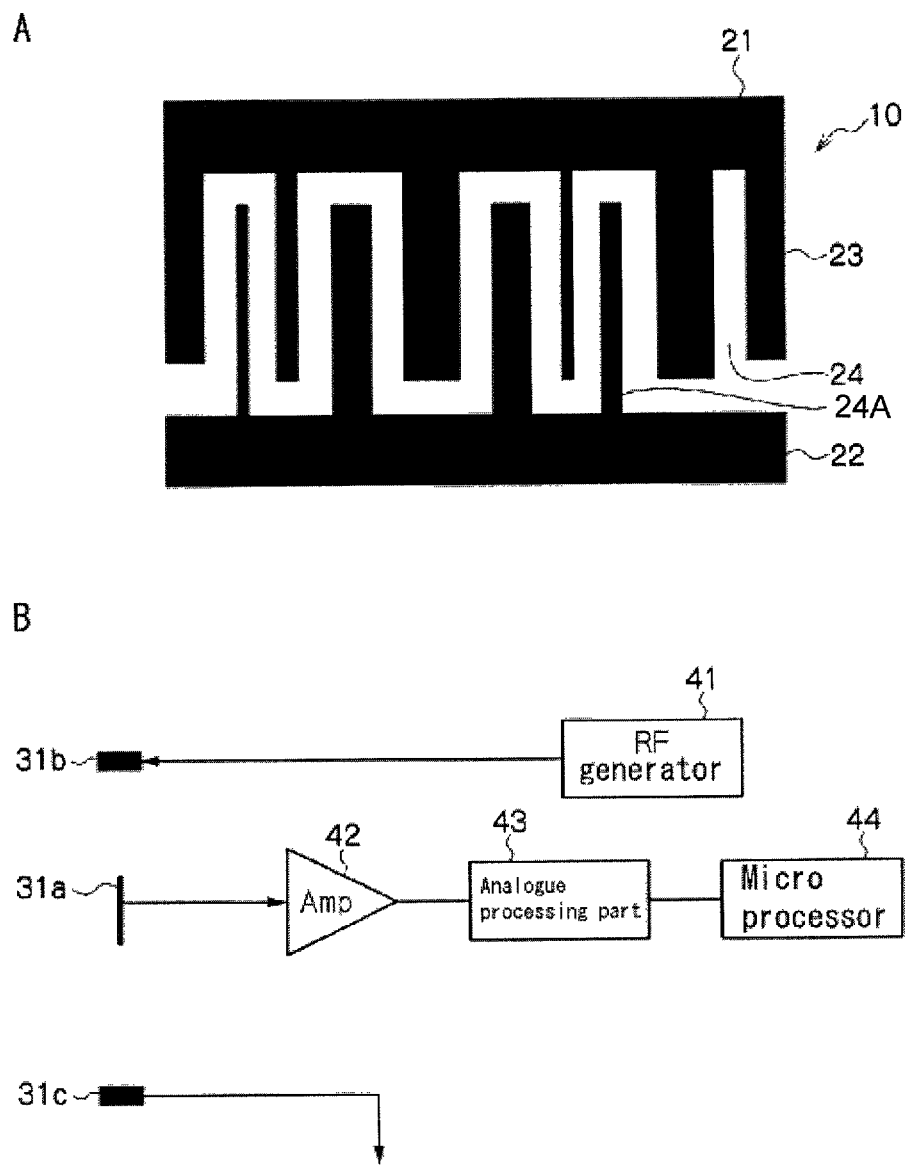
FIG. 7 is a view illustrating a constitution of an electrode sensor part corresponding to a constitution of a capacitive data of the present invention.
Figure 8:
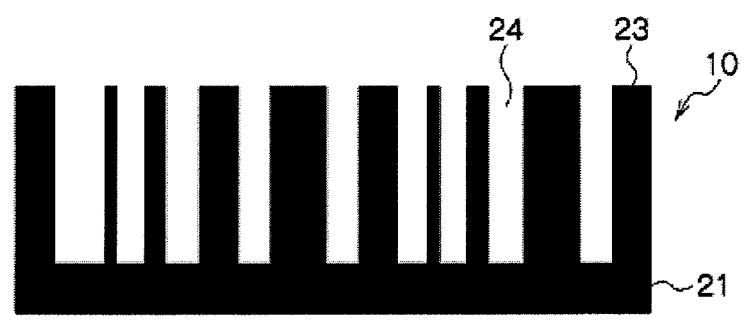
FIG. 8 is a view illustrating a constitution of an electrode sensor part corresponding to a constitution of a capacitive data of the present invention.
Figure 8:
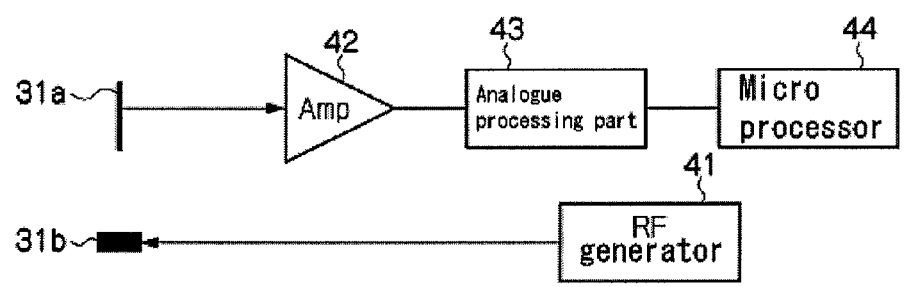

Patterns of the ID code recording part 10 may be those as shown in FIGS. 6, 7 and 8.

The ID code recording part 10 of the capacitive data body 1 as shown in FIG. 6A is constituted of the electrode planes 23 and non-electrode planes 24 arranged in one direction. In such capacitive data body 1, the widths of the electrode planes 23 and the non-electrode planes 24 are adjusted in the same way as those of the ID code recording part 10 as shown in FIG. 2. The data reading device 2 reads the voltage value corresponding to the widths of the electrode planes 23 and the non-electrode planes 24 and then reads a string of data exhibited on the ID code recording part 10. As shown in FIG. 6B, this data reading device 2 has the electrode sensor part 31a as a sensor electrode facing opposite to the electrode planes 23 and the non-electrode planes 24 and the electrode sensor part 31b as a RF electrode supplied with RF signals by the power source 32 as in the same way as the RF common electrode 21, at the time of reading data. The electrode sensor part 31b as a RF electrode is applied with an alternating-current voltage by the RF generator 41 equivalent of the power source 32. Voltage applied to the electrode sensor part 31b by the RF generator 41 shows a high value when the electrode sensor part 31b and the electrode planes 23 face opposite to each other, and is read by the amplifier 42, the analogue processing part 43 and the microprocessor 44. Voltage shows a low value when the electrode sensor part 31b and the non-electrode planes 24 face opposite to each other, and is read by the amplifier 42, the analogue processing part 43 and the microprocessor 44.

The ID code recording part 10 of the capacitive data body 1 as shown in FIG. 7A is constituted of the electrode planes 23 and non-electrode planes 24a arranged in one direction. The non-electrode plane 24 is a space between the electrode planes 23 made in combination with the comb-like electrode planes 23 protruded from the RF common electrode 21 and the comb-like electrode 24a protruded from the ground common electrode 22. The data reading device 2 as shown in FIG. 7B is provided with the electrode sensor part 31a as a sensor electrode that scans on the electrode planes 23, the electrode plane 24a and the non-electrode planes 24 at the time of reading a string of data, the electrode sensor part 31b as a RF electrode that scans on the RF common electrode 21, and the ground common electrode 31c that scans on the ground common electrode 22. Voltage applied to the RF common electrode 21 of the ID code recording part 10 by the RF generator 41 via the electrode sensor part 31b shows a high value when the electrode sensor part 31a and the electrode planes 23 face opposite to each other, and is read by the amplifier 42, the analogue processing part 43 and the microprocessor 44. Voltage shows a low value when the electrode sensor part 31c and the non-electrode plane 24a face opposite to each other, and is read by the amplifier 42, the analogue processing part 43 and the microprocessor 44.

The ID code recoding part 10 of the capacitive data body 1 as shown in FIG. 8A is constituted of the electrode planes 23 and non-electrode planes 24 arranged in one direction, and is provided with comb-like electrode planes 23 protruded from the RF common electrode 21. The non-electrode plane 24 is a space between the electrode planes 23. The data reading device 2 as shown in FIG. 8B is provided with the electrode sensor part 31a as a sensor electrode that scans on the electrode planes 23, the RF common electrode 21, and the non-electrode planes 24 at the time of reading a string of data, and the electrode sensor part 31b as a sensor electrode that scans on the RF common electrode 21. Voltage applied to the RF common electrode 21 of the ID code recording part 10 by the RF generator 41 via the electrode sensor part 31b shows a high value when the electrode sensor part 31a and the electrode planes 23 face opposite to each other, and is read by the amplifier 42, the analogue processing part 43 and the microprocessor 44. Voltage shows a low value when the electrode sensor part 31a and the non-electrode planes 24a face opposite to each other, and is read by the amplifier 42, the analogue processing part 43 and the microprocessor 44.

Such ID code recording part 10 can discharge the remaining electric charge in the electrode sensor part 31a to the non-electrode plane 24 because the electrode sensor part 31b exists on the RF common electrode 21 after the electrode sensor part 31a existing above the electrode plane 23 was conducted. Thus, when the electrode sensor part 31a is scanning above the non-electrode planes 24, the part can surely discharge the electric charge to make the data reading device 2 read a string of data.

Figure 9:
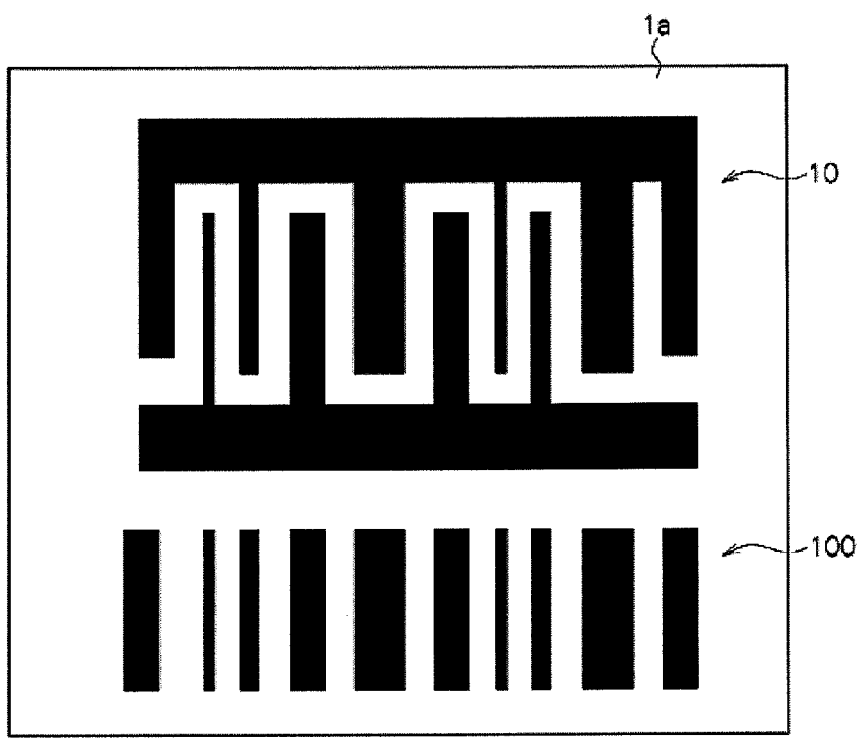
FIG. 9 is a view illustrating a constitution of a capacitive data of the present invention that an ID code recording part and a barcode are formed.

Further, as shown in FIG. 9, another constitution of the capacitive data may be a formation of the ID code recording part 10 and the barcode 100 on a single medium 1a. In such capacitive data, a string of data exhibited by the ID code recording part 10 is read by the data reading device 2 and the barcode 100 is read by the optical barcode reader. For example, in such capacitive data, the ID code recording part 10 may be invisible from the outside by covering the ID code recording part 10 with a cover label, and a string of data exhibited by the ID code recording 10 and a string of data exhibited by the barcode 100 are linked with each other and stored in a server device (not shown). A string of data exhibited by the ID code recording part 10 and a string of data exhibited by the barcode 100 are read by the data reading device 2 and the barcode reader, respectively, then being transferred to the server device. Then, the server device determines whether the string of data exhibited by the ID code recording 10 and the string of data exhibited by the barcode 100 are linked with each other or not, and can certify that the medium is an authentic one. This may realize a medium with security function. Moreover, the medium can be applied to only case where the ID code recording part 1 that a string of data is electrically read by the data reading device 2, the barcode 100 that a string of data is optically read by the barcode reader and a magnet recording part that a string of data is magnetically read are formed on the same medium 1a and these three strings of data are consistent in relation to each other, the medium can be certified for use. This is the same in a case of recording RFID or IC.

Figure 10:
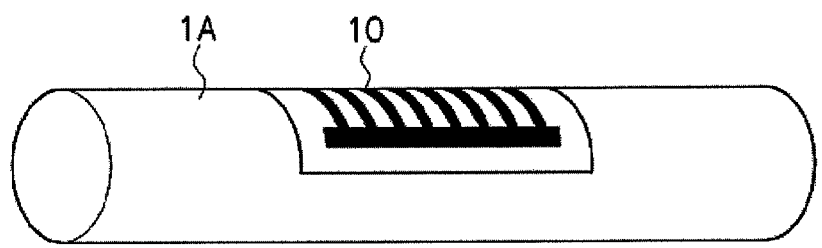
FIG. 10 is a perspective view illustrating a concrete capacitive data and an exterior constitution of a data reading device of the present invention.
Figure 10:
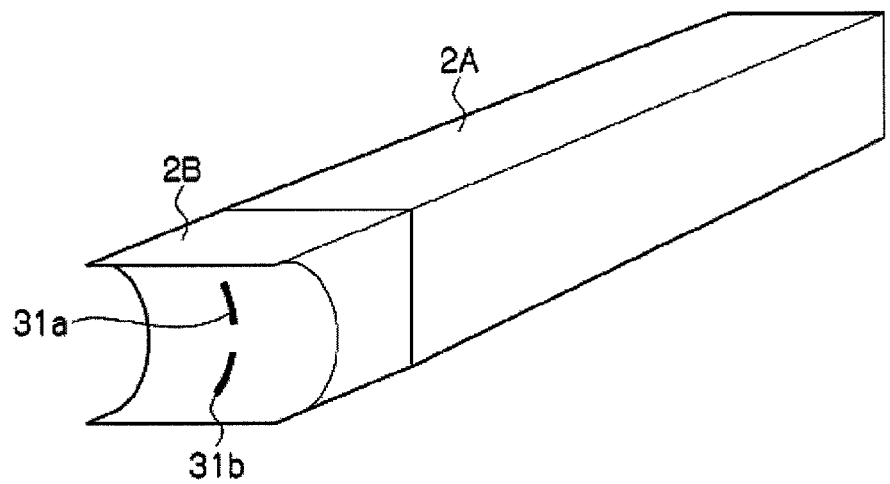

Further, the ID code recording part 10 may be formed not only on mediums like cards but also on arbitrarily-shaped material. The data reading device 2 is constituted so as to read the ID code recording part 10 formed on the arbitrarily-shaped material. For example, as shown in FIG. 10A, the ID code recording part 10 is formed on the surface of the material 1A for controlling the name of the cylindroid material 1A and the physical properties. For example, an ID for identifying the content is placed as a string of data exhibited by the ID code recording part 10 on multiple test tubes. As shown in FIG. 10B, the data reading device 2 for such arbitrarily-shaped material 1A is constituted of the reader body 2A stored with the aforementioned amplifier 42, the analogue processing part 43 and the micro processor 44 and others, and the reader adapter 2B with the exposed electrode sensor parts 31a and 31b. In such ID code recording part 10, the reader adapter 2B is arranged closely opposite to the material 1A in a manner of covering the electrode sensor parts 31a and 31b, and a string of data exhibited by the ID code recording part can be read.

Figure 11:
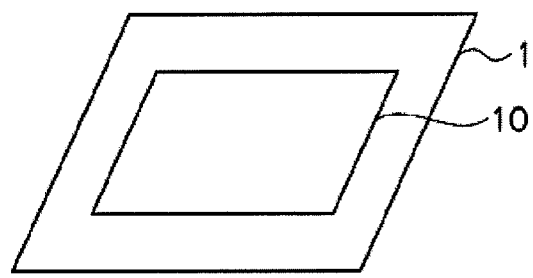
FIG. 11 is a perspective view illustrating a concrete capacitive data and an exterior constitution of a data reading device of the present invention.
Figure 11:
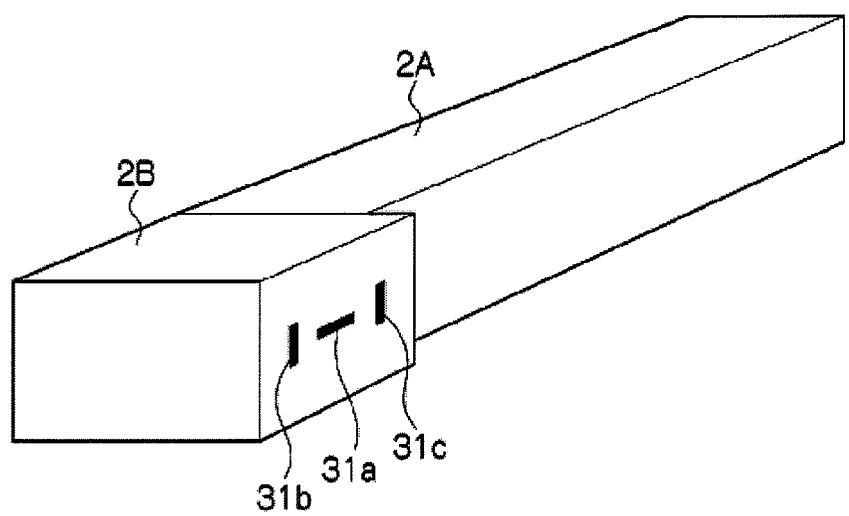

Furthermore, in the data reading device 2 as shown in FIG. 11A, the ID code recording part 10 is formed on the capacitive data on a plane surface, but the data reading device 2 as shown in FIG. 11B contains the reader body 2A stored with the aforementioned amplifier 42, the analogue processing part 43, the microprocessor 44 and others, and the reader adapter 2B attached with the electrode sensor parts 31a, 31b and 31c. In this case, capacitive data is not exposed. In such ID code recording part 10, when the reader adapter 2B contiguously scans on the capacitive data in a manner of covering the electrode sensor parts 31a, 31b and 31c, a string of data exhibited by the ID code recording part 10 can be read out.

The aforementioned capacitive data body 1 and data reading device 2 of the present invention can be applied to the following embodiments.

In the case in which capacitive data is formed on labels instead of cards, even if the labels are affixed at a slant, when the pen-type data reading device 2 scans at a slant, the capacitive data can be read out. The slant affixing of labels does not cause difficulties to read capacitive data.

Different from display-type barcodes that have been widely spread, a string of data can be read as capacitive data. It avoids unauthorized uses such like optical copying of a string of data.

Further, as the electrode planes 23 and the non-electrode planes 24 or the ground electrode planes 24a are not consisted of 0 and 1 of one bit according to the width thereof and consisted of a string of data exhibited by two bits, more quantity of data can be recorded on the capacitive data body 1 or labels.

Moreover, as the electrode planes 23 and the non-electrode planes 24 or the ground electrode planes 24a are constituted in a manner that the start bit and end bit are formed with the fixed widths A and B, a string of data thereafter can be detected according to a change in voltage value detected the electrode planes 23 and the non-electrode planes 24 or the ground electrodes 24a at the start bit. In addition, as a speed of scanning capacitive data by the data reading device 2 is obtained from a duration time of high voltage value that detects the electrode planes 23 at the start bit and a duration time of low voltage value that detects the non-electrode planes 24 or the ground electrode planes 24a at the start bit, a string of data thereafter can be detected. This enables to detect a string of data of capacitive data with high accuracy.

Furthermore, in the aforementioned example, a string of data can be detected according to the duration time at the low voltage value even when the data reading device 2 passes through on not only the electrode planes 23 but also the non-electrode planes 24 or the ground electrode planes 24a. The low voltage value detected by the non-electrode planes 24 or the ground electrode planes 24a may be used as a separation from the high voltage value.

FIG. 12 shows two examples of labels that are applied with capacitive data of the present invention. Label R1 in FIG. 12A is constituted in a manner that the capacitive data electrode 31 is printed on the top surface of the label base material 30, the top surface of the capacitive data electrode 31 is coated by the protection layer 32 and the top surface of the capacitive data electrode 32 is covered by the cover label 33. In addition, the label R2 in FIG. 12B is constituted in a manner that the capacitive data electrode 31 is printed on the top surface of the label base material 30 and the top surface of the capacitive data electrode 31 is coated by the protection layer 32.

The aforementioned capacitive data can be applied to the fields such as documents, more particularly including legal documents, documents for medium-term housing loan, certificates of authentication, contract sheets, public documents, passports and electronic notary certificates, commercial cards including credit cards, bank cards, gift cards, tickets, lottery tickets, casino tickets and various tickets, and ID cards including employee ID cards.

In the case of the aforementioned documents and various tickets, capacitive data printed on labels are affixed on the documents. Further, in commercial cards, in combination with magnet, IC, RFID and barcodes, they can become magnet, IC, RFID and barcodes with security.

The invention claimed is:

1. A capacitive data body having a capacitive data that a string of data printed on a card, a paper and a label as a medium is electrostatic inductively read, the capacitive data comprising
    a plurality of electrode planes formed in multiple kinds of different predetermined widths formed being spaced apart from each other in one direction,
    non-electrode planes, and ground electrode planes formed between the electrode planes,
    wherein, when electrodes for reading data charged on the electrode planes and the non-electrode planes, and ground electrode planes are scanned in one direction or in a direction opposite to the one direction,
    a capacitor is formed between the electrode planes and the electrodes for reading data and a string of data is read by an electrostatic inductively change in voltage according to the width of the electrode planes, wherein
    the capacitive data further comprises a RF common electrode and a ground common electrode, the electrode planes are comb-like and protruded from the RF common electrode, the ground electrode planes are comb-like and protruded from the ground common electrode, and
    the electrodes for reading data comprise: a sensor electrode to be scanned on the electrode planes, the non-electrode planes, and the ground electrode planes; a RF electrode to be scanned on the RF common electrode; and a ground electrode to be scanned on the ground common electrode.

2. A data reading device for electrostatic inductively reading a string of data from a capacitive data body having a capacitive data comprising a plurality of electrode planes formed in multiple kinds of different predetermined widths formed being spaced apart from each other in one direction, non-electrode planes and ground electrode planes formed between the electrode planes, the data reading device comprising:
    an electrode for reading data, being closely arranged opposite to the capacitive data body, the electrode and the capacitive data body being shifted in relation to one another in the one direction or in a direction opposite to the one direction;
    a RF generator as a power supply means for charging the electrode for reading data;
    a detecting means reading an electrostatic induction change in voltage according to a width of an electrode plane from the capacitive data body, at the time that the charged electrode for reading data being scanned on the electrode planes and the non-electrode planes or the ground electrode planes in the one direction or in a direction opposite to the one direction and a capacitor being formed between the electrode planes and the electrode for reading data; and
    a data reading means reading a string of data recorded on the capacitive data body according to a temporal change in an electrostatic induction detected by the detecting means, wherein
    the capacitive data further comprises a RF common electrode and a ground common electrode, the electrode planes are comb-like and protruded from the RF common electrode, the ground electrode planes are comb-like and protruded from the ground common electrode, and
    the electrode for reading data comprises: a sensor electrode to be scanned on the electrode planes, the non-electrode planes, and the ground electrode planes; a RF electrode to be scanned on the RF common electrode; and a ground electrode to be scanned on the ground common electrode.

* * * * *